(12) United States Patent
Deacon et al.

(10) Patent No.: US 6,928,208 B2
(45) Date of Patent: Aug. 9, 2005

(54) HITLESS TUNABLE OPTICAL ADD DROP MULTIPLEXER WITH VERNIER GRATINGS

(75) Inventors: David A.G. Deacon, Los Altos, CA (US); Steven J. Madden, Act (AU); Jorg Hubner, Aalsgaarde (DK)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 10/609,837

(22) Filed: Jun. 30, 2003

(65) Prior Publication Data

US 2004/0264850 A1 Dec. 30, 2004

(51) Int. Cl.⁷ .................................................. G02B 6/26
(52) U.S. Cl. ............................. 385/16; 385/30; 385/15; 385/37
(58) Field of Search .............................. 385/16, 15, 24, 385/3, 37, 39, 30, 26, 25, 31, 8, 9, 1, 2, 40, 50

(56) References Cited

U.S. PATENT DOCUMENTS

| 6,016,371 | A | * | 1/2000 | Wickham et al. ............. 385/10 |
| 6,078,418 | A | * | 6/2000 | Hansen et al. ............... 398/147 |
| 6,137,927 | A | * | 10/2000 | Keck et al. .................... 385/24 |
| 6,522,795 | B1 | * | 2/2003 | Jordan et al. .................. 385/10 |
| 2002/0176088 | A1 | * | 11/2002 | Johnson et al. ............. 356/477 |
| 2003/0086647 | A1 | * | 5/2003 | Willner et al. ................ 385/37 |

* cited by examiner

Primary Examiner—Kianni Kaveh
(74) Attorney, Agent, or Firm—Trop, Pruner & Hu, P.C.

(57) ABSTRACT

A set of three gratings may be operated in a vernier loop fashion to select a particular wavelength from a wavelength division multiplexed system. As a result, an optical add/drop multiplexer may be provided that can be tuned to select a desired wavelength. In one embodiment, the tuning may be done thermo-optically.

25 Claims, 1 Drawing Sheet

HITLESS TUNABLE OPTICAL ADD DROP MULTIPLEXER WITH VERNIER GRATINGS

BACKGROUND

This invention relates generally to add/drop multiplexers useful in optical communication networks.

Many optical communication networks operate as wavelength division multiplexed networks wavelength channels. In such networks, a number of information containing light signals (channels), of different wavelengths, may be multiplexed over a single optical communication path. At desired points, signals of a given wavelength may be added or removed from the optical path. An add/drop multiplexer is utilized to add and/or remove a particular wavelength channel from the optical path.

Tunable add/drop networks would offer a number of operating advantages to the service provider. Existing add/drop multiplexer technologies may be combined in ways that accomplish tunability. However, such a functionality on its own may be of little use in a network because of the impact on existing data streams while the components are being tuned. What is needed is a "hitless" tunable add/drop with the ability to tune without affecting or "hitting" the existing data flows. Hitless tunability may be achieved using paired analog switches to reroute the data stream through a bypass optical circuit, thereby protecting the data flow during the switching time of the add/drop multiplexer, or by using a full crossbar switch between pairs of wavelength demultiplexers.

These existing approaches may have cost, structural, and control complexities due to the use of paired analog switches or crossbar switches. In addition, they may have cost, environmental sensitivity, and reliability issues related to the use of mechanical structures.

Thus, there is a need for a better way to provide a tunable add/drop multiplexer.

DETAILED DESCRIPTION

In some embodiments, the present invention provides an optical add/drop multiplexer using a combination of at least three sampled gratings, thermally tuned over a narrow frequency range and operated in a vernier loop configuration to select one or no wavelength channels to add or drop across a wide frequency range.

In a waveguide optical integrated circuit, three non-resonant parallel couplers, each containing optical sampled gratings, may be disposed as three grating assisted couplers in a vernier loop configuration to add and drop a single wavelength channel. A grating assisted coupler is a coupler with asymmetric and non-resonant waveguides that may be of different propagation constants. Resonance may be achieved using a grating written into the coupler in a region where the light in both waveguides overlaps. The grating may be sampled in one embodiment. A sampled grating may have a multi-peak optical spectrum with a given spectral peak separation and may be thermally tunable over a range at least as large as the peak separation. Two grating designs may be used with slightly different spectral peak separations so that over a relatively wide frequency range, only one pair of peaks may be made to coincide. The width of the individual grating peaks is selected to be narrow compared to the spectral peak separations so that some tuning states allow no peak overlap within the desired operating range in some embodiments of the present invention.

Figure 1:
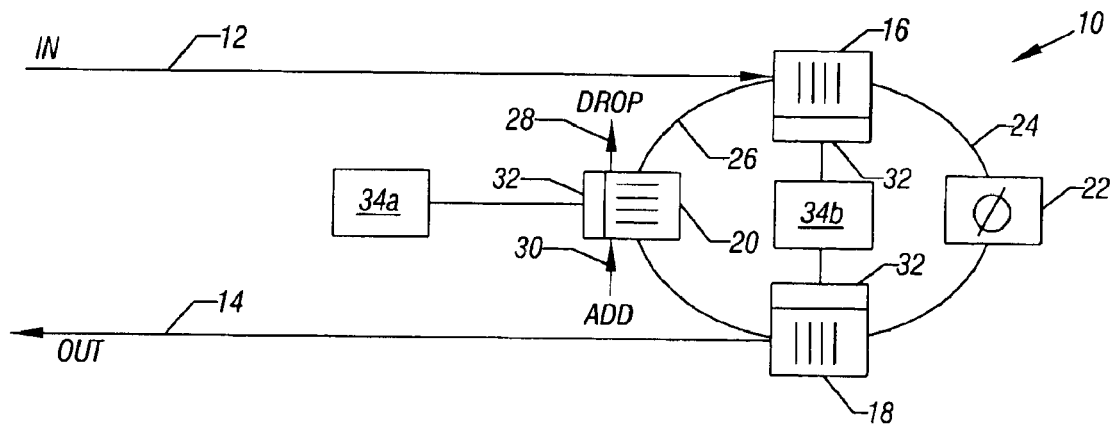
FIG. 1 is a schematic depiction of one embodiment of the present invention.

Referring to FIG. 1, in one embodiment, a principal waveguide 24 may include an input path 12 and an output path 14. The waveguide 24 may be part of a planar lightwave circuit or may be an optical fiber, as two examples. A pair of identical grating assisted couplers 16 and 18 may be provided on the principal waveguide 24 in one embodiment. A third grating assisted coupler 20, with slightly different peak separation, may be located on the bypass waveguide 26 that forms a loop with the principal waveguide 24, intersecting the principal waveguide 24.

The couplers 16, 18, and 20 may have a thermal actuator 32 for tuning the gratings. The two actuators 32 on the principal waveguide 24 may be actuated in the same way, for example, by a controlled power supply 34b. The thermal actuator 32 on the bypass waveguide 26 may be controlled independently by a controlled power supply 34a. The waveguide circuit 10 may have an optical input port 12, an output port 14, an add port 30, and a drop port 28.

In one embodiment, the gratings in 16, 18, and 20 may be entirely reflective and the optical paths defined by the waveguides 24 and 26 may be equal. The couplers 16 and 18 may be aligned to couple a multiplicity of wavelength channels across the secondary waveguide 26. Isolation may be achieved in some embodiments because any leaking light along the principal waveguide 24 is filtered out twice. Light in the secondary waveguide 26 is then totally coupled back into the output port 14 by the coupler 18.

If the two path lengths (coupled and non-coupled channels) are the same, as illustrated, the configuration may be hitless because the data packets go either direction without experiencing any relative time delay. A phase control 22 may be provided in some embodiments to reduce destructive interference upon recombination. In one embodiment, the path length around the bend is exactly equal on the waveguides 24 and 26, so a single phase setting may be adequate for all channels.

When the couplers 16 and 18 are tuned, the effective reflection depth into the grating changes, dynamically unbalancing the equal (at full reflection) path lengths. This effect can be compensated dynamically by changing the phase control 22 during tuning.

The coupler 20 accomplishes the dropping or adding of a single wavelength channel, leaving the other channels unaffected. In operation, the majority of channels pass straight through the device 10 and through the phase control 22. A first set of wavelength channels is selected by the coupler 16 to pass through the secondary waveguide 26. These channels are reinserted into the output port 14 by the coupler 18, with the exception of the unique channel that is dropped or added at the coupler 20.

The gratings may be designed to operate in a vernier fashion so that either a single wavelength channel (or no channels) are selected out for drop or add. The spectra of the (identical) gratings in the couplers 16 and 18 have a first peak spacing whereas the spectrum of the grating in the coupler 20 has a different peak spacing. Channels that lie within the spectrum given by the product of the two grating spectra are dropped (and/or added). Because of the different peak spacing, the product spectrum typically has only a single peak. The adjacent peaks do not overlap.

The single peak may be tuned to drop and/or add an individual wavelength channel. By tuning the gratings together at the same rate, the product spectrum tunes continuously from one channel to the next. By tuning the grating spectrum of coupler 20 relative to the spectrum of couplers 16 and 18, the product spectrum tunes in jumps between adjacent peaks of the sampled grating spectra, skipping over many channels at a time. Thus, by appropriate tuning of the two spectra (together and/or relative), any individual channel may be selected over a broad tuning range.

By making the width of the individual grating spectra sufficiently narrow, tuning states are enabled in which no wavelength channel is selected. Further, tuning states may be chosen in which the product grating spectrum peak lies between channels so that, again, no channel is selected. Hitless operation may be achieved by selecting only no-channel states between channel-tuned states.

Figure 2:
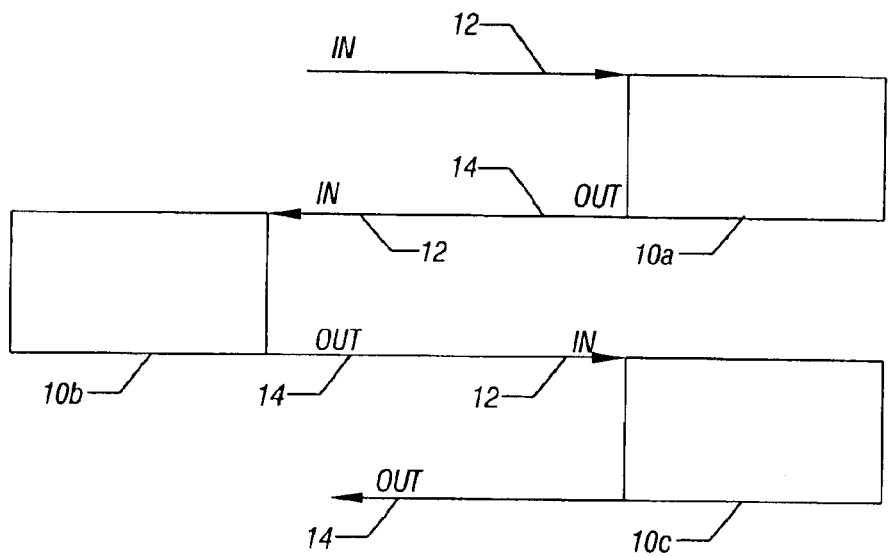
FIG. 2 is a schematic depiction of another embodiment of the present invention.

Referring to FIG. 2, multiple independent multiplexers 10 may be provided in any convenient geometry, provided that crossings are sufficiently isolated and thermal effects are well controlled. In the embodiment shown in FIG. 2, the output of a first multiplexer 10a is provided as the input of a second multiplexer 10b and the output of the second multiplexer 10b is provided as the input of a third multiplexer 10c.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An add/drop multiplexer comprising:
   a first and a second waveguide;
   a first and second thermally tunable grating coupled to the first waveguide; and
   a third thermally tunable grating coupled to the second waveguide coupled to said first and second thermally tunable gratings, wherein said gratings are in a vernier loop configuration.

2. The multiplexer of claim 1 including a phase control in said first waveguide.

3. The multiplexer of claim 1 wherein said gratings are sampled gratings.

4. The multiplexer of claim 1 wherein said multiplexer is hitless.

5. The multiplexer of claim 1 wherein said first and second waveguides are of substantially equal length.

6. The multiplexer of claim 1 including a first power supply for said first and second gratings and a second power supply for said third grating.

7. The multiplexer of claim 1 wherein the first and second gratings have substantially the same peak separation and said third grating has a different peak separation.

8. The multiplexer of claim 1 wherein said third grating is coupled to an add port for inputting a selected channel into an output port and wherein said third grating is further coupled to a drop port for extracting a selected channel from said output port.

9. An add/drop multiplexer comprising:
   a first and a second waveguide that are substantially equal in length;
   a first and second tunable grating coupled to said first waveguide; and
   a third tunable grating coupled to the second waveguide, said second waveguide coupled to said first and second tunable gratings, said third grating including an add port and a drop port, wherein said gratings are in a vernier loop configuration.

10. The multiplexer of claim 9 wherein said gratings are thermally tunable.

11. The multiplexer of claim 9 including a phase control in said first waveguide.

12. The multiplexer of claim 9 wherein said gratings are sampled gratings.

13. The multiplexer of claim 9 wherein said multiplexer is hitless.

14. The multiplexer of claim 9 including a first power supply for said first and second gratings and a second power supply for said third grating.

15. The multiplexer of claim 9 including an add port coupled to said third tunable sampled grating for inputting a selected channel to an output port.

16. The multiplexer of claim 15 including a drop port coupled to said third tunable sampled grating for extracting a selected channel from said output port.

17. An add/drop multiplexer comprising:
   a first and a second waveguide;
   a first and second thermally tunable grating coupled to said first waveguide; and
   a third thermally tunable grating coupled to the second waveguide coupled said first and second thermally tunable gratings, said first and second gratings have substantially the same peak separation and said third grating having a different peak separation.

18. The multiplexer of claim 17 including a phase control in said first waveguide.

19. The multiplexer of claim 17 wherein said multiplexer is hitless.

20. The multiplexer of claim 17 including a first power supply for said first and second gratings and a second power supply for said third grating.

21. An add/drop multiplexer comprising:
   a first and second waveguide;
   a first and second thermally tunable grating coupled to the first waveguide; and
   a third thermally tunable grating coupled to the second waveguide coupled to the first and second thermally tunable gratings, wherein said third grating is coupled to an add port to input a selected channel into an output port and wherein said third grating is further coupled to a drop port to extract a selected channel from said output port.

22. The multiplexer of claim 21 wherein said gratings are sampled gratings.

23. The multiplexer of claim 21 including a phase control in said first waveguide.

24. The multiplexer of claim 21 wherein said multiplexer is hitless.

25. The multiplexer of claim 21 wherein said first and second waveguides are of substantially equal length.

* * * * *